United States Patent [19]

Jacobs, Sr.

[11] Patent Number: 5,896,022
[45] Date of Patent: Apr. 20, 1999

[54] BATTERY CHARGE MANAGING SYSTEM

[76] Inventor: John T. Jacobs, Sr., 2121 West La., Louisville, Ky. 40216

[21] Appl. No.: 08/925,334

[22] Filed: Sep. 8, 1997

Related U.S. Application Data

[60] Provisional application No. 60/033,154, Dec. 13, 1996.

[51] Int. Cl.$^6$ ................................................ H01M 10/46
[52] U.S. Cl. ............................................................ 320/103
[58] Field of Search .................................. 320/103, 104, 320/116, 117, 121, 123, FOR 105, FOR 111, FOR 155, FOR 156, FOR 160, DIG. 33, DIG. 34; 180/65.1; 322/7, 14, 88

[56] References Cited

U.S. PATENT DOCUMENTS

| | | |
|---|---|---|
| 4,081,738 | 3/1978 | Roller . |
| 5,225,761 | 7/1993 | Albright . |
| 5,233,282 | 8/1993 | Iwashita . |
| 5,418,444 | 5/1995 | Cook et al. . |
| 5,448,152 | 9/1995 | Albright . |

*Primary Examiner*—Edward H. Tso
*Attorney, Agent, or Firm*—Richard C. Litman

[57] ABSTRACT

A modification kit for the addition of an auxiliary battery charge management system for a marine or land vehicle having a starting battery and an auxiliary battery system. The kit includes a single pole breaker, a normally-on relay, and a two-way toggle switch. The single pole breaker is inserted in a circuit of the auxiliary battery system, and the normally-on relay and the toggle switch are inserted in the starting battery circuit of the vehicle to provide a dual mode charging system adapted to manual and automatic power regeneration of the starting battery and the auxiliary battery system.

14 Claims, 1 Drawing Sheet

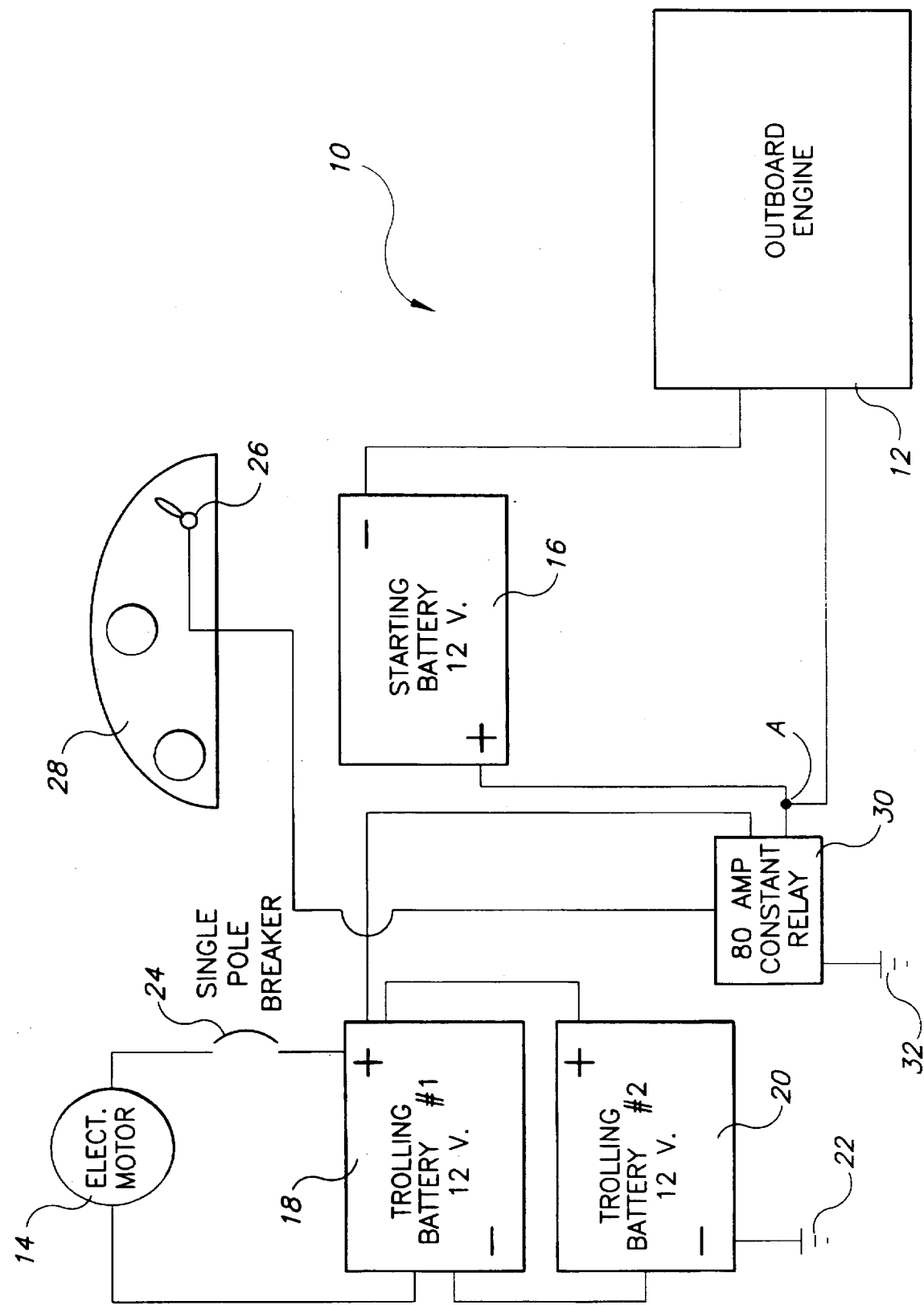

BATTERY CHARGE MANAGING SYSTEM

CROSS-REFERENCE TO RELATED APPLICATION

This application claims the benefit of U.S. Provisional patent application Ser. No. 60/033,154, filed Dec. 13, 1996.

BACKGROUND OF THE INVENTION

1. Field of the Invention

The present invention is directed primarily to a dual mode battery charge managing system for land and marine vehicles. The system is dual mode in that it can be operated manually or automatically. The modification kit is inexpensive and readily installed by any owner. The present invention can be utilized for marine vehicles, e.g., fishing boats, pontoon boats, pleasure boats, etc., for operating live bait wells, as well as for non-marine vehicles such as hydraulic dump trailers and wrecker machines that must maintain auxiliary batteries for purposes such as for starting (boosting) the engine or running other electronic components, e.g., radio and the like.

2. Description of Related Art

The prior art describes various boat battery charging systems. These systems are expensive to install and to maintain. There is a need for a simpler and more economical installation which a boat owner can readily install, and still have peace of mind that the boat batteries are always charged in an operative condition. The prior art will be discussed in the order of perceived relevance to the present invention.

U.S. Pat. Nos. 5,448,152 and 5,225,761 issued respectively on Sep. 5, 1995 and Jul. 6, 1993, to Charles D. Albright describe similar battery management systems differing only in the source of the DC voltage, wherein an inboard boat engine charges a plurality of batteries arranged in parallel for an electric boat motor. In the earlier patent the DC voltage is derived from the alternating current component of the charging signal, whereas in the later patent the time-varying component of the charging signal is sensed. In these completely automated systems, there is automatic charging of the auxiliary batteries while the boat engine is operating, and automatic switching out of the charging process when the boat engine is inoperative. Two 12 volt auxiliary batteries are coupled in parallel with the main battery to receive charging, and the auxiliary batteries provide 24 volts for the trolling motor by loading in series. The present invention applies only to the conversion of an outboard motor-electric motor system or a new installation thereof, and does not require a completely automatic system as described by Albright, which system is expensive to install and difficult to repair when trouble arises due to rough weather, for example.

U.S. Pat. No. 5,233,282 issued on Aug. 3, 1993, to Takashi Iwashita describes a battery system for an inboard internal combustion engine that drives a generator and electric motors. A pair of contact relays, responsive to the main switch, are used to adjust the circuitry of the battery system so that the actuating batteries are either connected in parallel in the charging state or connected in series in the actuating state. The instant invention is not directed to an inboard gas engine with generators for charging.

U.S. Pat. No. 4,081,738 issued on Mar. 28, 1978, to William G. Roller describes a plural battery control apparatus for controlling trolling motor batteries. A three-position switch couples two batteries into a circuit and switches the batteries into a parallel or series configuration across a load. The batteries are switchable for application of a remote charging device or for higher voltage (series) or lower voltage (parallel) use. The voltage condition of the batteries is constantly monitored. The present invention requires only a two-way switch for operation of the charging system for batteries for the outboard motor and the electric motor.

U.S. Pat. No. 5,418,444 issued on May 23, 1995, to Gary L. Cook et al. describes an automatic battery charge and discharge control system for boats having an inboard gas engine and auxiliary batteries running on 12 volts or multiples thereof. When the engine ignition is turned on, the main battery is connected in parallel during charging, and when turned off isolates the main battery from the auxiliary batteries, allowing the auxiliary batteries to discharge without affecting the voltage potential of the main battery. An override of the ignition control when the ignition control is turned off allows the main battery to be placed in parallel with the auxiliary batteries and to be charged by the charging circuit. The charger circuit can sense the charge potentials of the main and auxiliary batteries so that charging of either the main battery or the auxiliary batteries can be automatically stopped when fully charged. This automatic system is applicable only to an inboard gas engine and would not operate with an outboard engine lacking a voltage regulator and an alternator.

None of the above inventions and patents, taken either singularly or in combination, is seen to describe the instant invention as claimed. Thus, an economical boat battery charging system solving the aforementioned problems for an outboard gas engine and auxiliary electric motors is desired.

SUMMARY OF THE INVENTION

The economical battery charge managing system is primarily designed for either including in a new vehicle, land or marine, or modifying an existing electrical system in a vehicle. The electrical system can be used to benefit hydraulic dump trailers, wrecker machines, pontoon boats, and motorized fishing boats and the like. As an example, a marine system comprising an outboard motor and electric trolling motors is illustrated. A dual mode conversion system for operation of recharging the boat motors either manually or automatically is described. A modification kit for an existing electrical system is provided for convenient installation to an existing system. The conversion system can be utilized for other marine and non-marine vehicles requiring auxiliary batteries for starting the engine, operating a live bait well, radio and the like accessories.

Accordingly, it is a principal object of the invention to provide a dual mode, battery charge management system which can be operated either manually or automatically for marine or land vehicles.

It is an object of the invention to provide a battery charge management system for hydraulic dump trailers, wrecker machines, pontoon boats, and fishing boats.

It is another object of the invention to provide a charging system for boats with outboard motors and electric trolling motors.

It is a further object of the invention to provide a method for installing the battery charge managing system in an existing charging system.

Still another object of the invention is to provide a battery charge managing system conversion kit which is economical and readily installed by any owner.

It is an object of the invention to provide improved elements and arrangements thereof in a battery charge management system for the purposes described which is inexpensive, dependable and fully effective in accomplishing its intended purposes.

These and other objects of the present invention will become readily apparent upon further review of the following specification and drawing.

BRIEF DESCRIPTION OF THE DRAWING

The single FIGURE is a schematic diagram of a dual mode boat battery charger system as an exemplary example of the present invention.

DETAILED DESCRIPTION OF THE PREFERRED EMBODIMENT

The present invention is illustrated by an example of a boat battery charge management system in the form of a kit which can modify an existing electrical system on a boat such as a bass boat or that can be an original installation. The FIGURE is a schematic representation of the present invention showing the dual mode circuitry 10 based on an outboard motor 12 and an electric motor 14. The outboard motor 12 can be a single motor, e.g., V-6 (150 HP), or a smaller motor or dual outboard motors. Since an outboard motor and the electric motors do not inherently have either an alternator or generator incorporated with any motor, the problem of complete discharging of the batteries is encountered and can be dangerous in inclement weather. The V-6 motor has a conventional stator-rectifier system which generates DC electricity for recharging the battery system.

The outboard gas motor 12 has its own starting 12 volt battery 16. The electric motor 14 has a first 12 volt trolling battery #1 18 and a second 12 volt trolling battery #2 20 connected in parallel. Battery 20 is grounded at 22. The electric motor 14 is powered by the trolling batteries 18, 20, but has a single pole circuit breaker device 24 inserted between them for preventing damage to the trolling batteries 18, 20 in the event that a short arises in the electric motor 14.

Turning to the charging circuit comprising an on-off toggle switch device 26 located conveniently on the dashboard 28, an 80 Amp. constant or normally-on relay 30 (grounded at 32) is actuated when the switch device 26 is in the "on" or energizing position. This automatic charging mode permits the electricity generated by the stator-rectifier in the outboard motor 12 to pass through the relay device 30 from point A to the trolling batteries 18, 20 for recharging.

When the toggle switch device 26 is in the "off" or non-energizing position, the trolling motor 14 and the batteries 18, 20 are not in the charging circuit due to the normally-on or constant relay 30, with only the starting battery 16 being charged when the outboard motor 12 is running.

This conversion kit costs a small fraction of the currently available conversion kits which require a professional to install the system. Such a system has 51 parts. In the present invention, only a toggle switch device 26, a relay device 30, and necessary wiring are required, and the boat owner can readily install the dual mode circuitry 10.

It has been found over a period of use that the dual mode circuitry 10 has resulted in an average time of 4.5 hours of operation of a 150 HP outboard motor with an average recharging time of 4 minutes. When two 12 volt batteries connected in parallel were used, an average of 7.5 hours of operation and 10 minutes in recharging time were observed.

As noted above, the conversion kit can be adapted to aid other marine vehicles such as pontoon boats and non-marine vehicles such as battery powered hydraulic dump trailers and wrecker machines with slave batteries for assistance in starting and in energizing accessories such as radios. In fact, several dump trailers have been operated for over half a year with the modified inventive system without requiring any recharging of their batteries.

It is to be understood that the present invention is not limited to the embodiment described above, but encompasses any and all embodiments within the scope of the following claims.

I claim:

1. A battery charge managing system for a vehicle selected from a marine vehicle and a land vehicle having an auxiliary battery system comprising:

a starting primary battery in a closed circuit, and an engine of a vehicle selected from a marine vehicle and a land vehicle, which charges said starting primary battery when said engine is running;

multiple secondary batteries, an electric motor powered by said multiple secondary batteries, a recharging circuit for said multiple secondary batteries, and a normally-on relay device operable when off for opening said recharging circuit for said multiple secondary batteries, and said normally-on relay device being connected to said starting primary battery circuit;

said multiple secondary batteries being connected in parallel to operate said electric motor, and said multiple secondary batteries being in series with a single pole breaker device; and a two-way toggle switch device being connected to said normally-on relay device for opening said recharging circuit when in an energizing position; whereby continuous recharging of the multiple secondary batteries occurs when said primary engine is running and the two-way toggle switch device is in the energizing position.

2. The battery charge managing system according to claim 1, wherein the starting primary battery and the multiple secondary batteries each have a capacity selected from 12 volts and 24 volts.

3. The battery charge managing system according to claim 1, wherein the vehicle engine is a marine engine.

4. The battery charge managing system according to claim 3, wherein said marine vehicle engine is a fishing boat engine, there further being a trolling motor, with said multiple secondary batteries energizing said trolling motor while the marine vehicle engine is running.

5. The battery charge managing system according to claim 4, wherein said starting primary battery and each of said multiple secondary batteries have a capacity selected from 12 volts and 24 volts.

6. The battery charge managing system according to claim 3, wherein said marine vehicle engine is a pontoon boat engine with said multiple secondary batteries energizing other electrical components while the marine engine is running.

7. The battery charge managing system according to claim 6, wherein said starting primary battery and each of said multiple secondary batteries have a capacity selected from 12 volts and 24 volts.

8. The battery charge managing system according to claim 1, wherein said land vehicle engine is a battery-powered hydraulic dump trailer engine.

9. The battery charge managing system according to claim 8, wherein said starting primary battery and each of said multiple secondary batteries have a capacity selected from 12 volts and 24 volts.

10. The battery charge managing system according to claim 1, wherein said land vehicle engine is a wrecker machine engine with said secondary batteries being slave batteries.

11. The battery charge managing system according to claim 10, wherein said starting primary battery and each of said multiple slave batteries have a capacity selected from 12 volts and 24 volts.

12. An outboard motor and an electric trolling motor combination, and a dual mode boat battery charger system for said outboard boat motor and an electric trolling motor combination comprising:

a starting primary battery in a closed circuit with said outboard boat motor which charges said starting primary battery when said outboard boat motor is running;

multiple trolling motor batteries for powering said electric trolling motor, a recharging circuit for said trolling motor batteries, and a normally-on relay device operable when off for opening a recharging circuit for said multiple trolling motor batteries, said normally-on relay device being connected to said closed battery circuit;

said multiple trolling motor batteries being connected in parallel to operate said electric trolling motor, and said multiple trolling motor batteries being in series with a single pole breaker device; and a two-way toggle switch device connected to the normally-on relay device for opening said recharging circuit when in an energizing position; whereby continuous recharging of the multiple trolling batteries occurs when said outboard engine is running and the two-way toggle switch device is in an energizing position.

13. The boat battery charger system according to claim 12, wherein the starting primary battery and the multiple secondary trolling batteries each have a capacity selected from 12 volts and 24 volts.

14. A modification kit for the addition of an auxiliary battery charge management system for a vehicle selected from a marine vehicle and a land vehicle having a starting battery and an auxiliary battery system comprising:

a single pole breaker device;

a normally-on relay device; and a two-way toggle switch device; wherein said single pole breaker device being inserted in a circuit of the auxiliary battery system, and said normally-on relay device and said toggle switch device being inserted in said starting battery circuit of said vehicle to provide a dual mode charging system adapted to manual and automatic power regeneration of the starting battery and the auxiliary battery system.

\* \* \* \* \*